Flaviano Glatti
Pierantonio Sanmartin
INVENTORS.

BY

Karl G. Ross
Attorney

June 12, 1973   F. GLATTI ET AL   3,738,956
POLYVINYL CHLORIDE COVERING FOR A PLANT ENCLOSURE CONTAINING
SURFACE ACTIVE AGENTS TO MODIFY WATER-CONDENSATE
DROPLET CONTACT ANGLE
Filed April 8, 1970   3 Sheets-Sheet 3

Flaviano Glatti
Pierantonio Sanmartin
INVENTORS.

BY

Karl G. Ross
Attorney 3,738,956
POLYVINYL CHLORIDE COVERING FOR A PLANT ENCLOSURE CONTAINING SURFACE ACTIVE AGENTS TO MODIFY WATER-CONDENSATE DROPLET CONTACT ANGLE
Flaviano Glatti, Mestre, and Pierantonio Sanmartin, Padova, Italy, assignors to Montecatini Edison S.p.A., Milan, Italy
Filed Apr. 8, 1970, Ser. No. 26,646
Claims priority, application Italy, Apr. 10, 1969, 15,342/69
Int. Cl. A01g 9/00; C08f 45/02, 45/66
U.S. Cl. 260—41 R
1 Claim

ABSTRACT OF THE DISCLOSURE

A method of controlling plant growth which involves enclosing the growth site in a structure having a translucent covering of synthetic-resin containing surface-active agents to reduce the contact angle of water droplets formed thereon from vapor condensation less than 75° and preferably lower than a critical L-value wherein L is the contact angle and $$\sin L = \frac{n_2}{n_1}$$

$n_2$ and $n_1$ being the indices of air and water respectively.

(1) FIELD OF THE INVENTION

Our present invention relates to transparent or translucent structures for controlling plant growth, to a method of controlling and promoting plant growth and to structure for the protection of horticulture, flower culture and fruit culture.

(2) CROSS-REFERENCE TO COPENDING APPLICATIONS

In the commonly assigned copending application Ser. No. 839,652, filed July 7, 1969, which represents a further development of the system described in the still-earlier commonly owned application, Ser. No. 603,388, filed Dec. 20, 1966, by Flaviano Glatti (now U.S. Pat. No. 3,542,710), one of the present joint inventors, there is described a plastic film or foil for use as an enclosure or covering material for plant beds and growth chambers.

The foil described in the earlier application is a translucent vinylchloride based polymer containing, in the sheet material, a major proportion of a polymeric component with at least 75% by weight chemically combined vinylchloride, a thermal stabilization component and an ultraviolet-absorbing component. The sheet material also included a plasticizing component and at least one vinylchloride dyestuff, preferably of the phthalocyanine or azo type and designed to provide a desired distribution of light transmissivity over the solar light spectrum intercepted by the protective covering.

It was there pointed out that such combinations are effective for the control of plants of substantially all types, in spite of the fact that one would normally consider a colored (tinted) synthetic-resin sheet material to be practically useless and undesirable for growth forcing, controlled growing of plant life and growth protection of fruit, flowers or vegetables.

The vinylchloride materials are those formed by polymerizing vinylchloride alone or in admixture with up to 25% by weight of monomers copolymerizable therewith in aqueous suspension to yield a polymeric material having a K-number between 60 and 90 and preferably a K-number of about 70. The coloring component of the foil of application Ser. No. 603,388 preferably includes one or more blue, red, violet, green or yellow dyes. Best results are obtained with red and violet tinted sheet materials.

In the subsequently filed application Ser. No. 798,781 of Feb. 12, 1969 (abandoned but replaced by a continuation application), Ser. No. 145,867, filed May 21, 1971, in the name of Flaviano Glatti alone, it was pointed out that maximum growth could be produced with a greenhouse or light covering of synthetic-resin film or foil in which the tinting agents and composition are such that the minimum light transmittance of the foil (in the visible range) lies within one of three primary spectral zones (on terms of wave length): 4100 to 4500 A., 4900 to 5400 A. and 5250 to 5750 A. The maximum transmittance of this covering material lies in the range of 6300 to 7500 A., such that there exists a secondary maximum-transmittance zone between 6300 and 6600 A. in which the transmittance at a maximum is greater than 50%, and a further secondary zone of 6600 to 7500 A. in which the maximum transmittance exceeds 70%. As a consequence, there is a minimum transmittance between 3800 and 5900 A., a transmittance in excess of 50% at 6300 to 6600 A. and a transmittance in excess of 70% between 6600 and 7500 A.

Application Ser. No. 839,652 pointed out that a synthetic-resin film having a total transmittance, in percentage terms, which is less than 40% on the average for sunlight of a wave length of 3000 to 7000 A. and on the average is in excess of 60% for those portions of the sunlight spectrum with a wave length above 9000 A. The film of this latter application is used advantageously as a mulch through the openings of which plant growth is forced. The film has a thickness of 0.01 to 0.5 mm., has a total transmittance (percent of the incident light transmitted) ranging between 0 and 10% for the sunlight spectrum between 3000 and 5000 A., 0 to 35% for the portion of the sunlight spectrum between 5000 and 7500 A., 0 to 90% for the portion of the sunlight spectrum with a wavelength between 7500 and 9000 A. and 60 to 90% for the portion of the sunlight spectrum with a wavelength of about 9000 A., the transmittance of 60 to 90% above 9000 A. is preferably concentrated in the zone of 9000 to 15,000 A.

(3) BACKGROUND OF THE INVENTION

Aside from the use of the aforedescribed foils in the promotion and control of plant growth, others have suggested that it is possible to regulate or promote enclosed cultivation by using, as the covering for the enclosure, selected synthetic-resin foils.

It has now been found that all of these systems for controlling and regulating plant growth, which make use of enclosures of the plantation or plant bed, are characterized by a disadvantage apparently resulting from temperature gradients across the covering. It has been recognized that the inner surface of the covering, i.e. the surface within the enclosed plant space receives, develops or sustains the formation of water condensate analogous to dewing droplets. We have noted that the condensate droplets in the case of plant coverings as described above, are substantially of hemispherical configuration and are strongly absorbent of solar energy in the infrared range so that a substantial portion of the luminous and thermal solar energy desired at the plants within the enclosure is consumed or dissipated in the droplets accumulated along the inner surface of the covering. The transmitted energy is, moreover, reflected from the interfacial surfaces of the droplets.

(4) OBJECTS OF THE INVENTION

It is the principal object of the present invention, therefore, to provide an improved method of controlling plant growth within an enclosure having a synthetic-resin translucent covering, whereby the detrimental effect of moisture droplets along the inner surface of the covering can be obviated and the plant growth efficiency increased at relatively little cost.

Another object of our invention is to provide a covering for plant growth enclosures which is capable of accelerating, forcing or controlling the rate and quality of plant growth without disadvantages of the type discussed above and especially without the detrimental effects of moisture droplets along the inner surfaces of such coverings.

It is also an object of our invention to provide agricultural enclosures having film, plate or other synthetic-resin coverings adapted to reduce to a minimum losses of thermal and luminous energy along the inner surfaces of the covering.

(5) SUMMARY OF THE INVENTION

These objects and others, which will become apparent hereinafter, are attained, in accordance with the present invention, by a method which involves the modification of the inner surface of the protective covering of greenhouse and plant growth enclosures such that a water-vapor condensation droplet thereon has a contact angle with the inner surface which is less than 75° and preferably is less than a critical angle L defined by the relationship $$\sin L = \frac{n_2}{n_1}$$

where $n_2$ and $n_1$ are respectively the index of refraction of air and water measured at 25° C. using the D line of a sodium light source, i.e. $n_D^{25}$.

The specified contact-angle relationship, which is critical to the elimination of the adverse effects of droplet condensation upon the inner surface of the covering, although it does not eliminate such condensation, is established in accordance with the present invention, by the incorporation in the thermoplastic sheet material of one or more surface-active agents capable of modifying the interfacial tension at the solid-liquid interface and thereby reducing the normally hemispheric droplet (contact angle of about 90°) to a droplet whose contact angle is less than 75° and preferably lies below the critical value $$L = \arcsin \frac{n_2}{n_1}$$

The covering according to the present invention is a thermoplastic material consisting of a polymer or copolymer of the vinyl or vinylidene type and preferably vinylchloride or vinylidenechloride, a polyolefin such as polyethylene or polypropylene, a styrene or substituted styrene such as vinylbenzene or alphamethylstyrene, a nitrile such as acrylonitrile or methacrylonitrile, a vinyl ester such as vinyl acetate or vinyl propionate, an acrylic ester (alkyl ester of unsaturated acids) such as acrylates and methacrylates, polyamides, polyesters, cellulosic esters and polyoxymethylenes and mixtures, copolymers and graft polymers thereof.

The heat and light stabilizers, which are incorporated in the composition according to the present invention, can include a barium, cadmium, lead, zinc, tin or magnesium soap or combinations thereof which may be further combined with stabilizers of other types known in sheet materials of this character, i.e. epoxy stabilizers or the like. Epoxy stabilizers have been found to have synergistic properties when used in conjunction with the stabilizing soaps. The term "soap" as used in this connection, is intended to refer to the reaction product of a metal or metal compound with a long-chain carboxylic acid (fatty acid) e.g. stearate salts. Other fatty-acid groups may, of course, constitute the organic chains of the metal salts of this component.

Advantageously, the thermoplastic composition of the present invention includes an optical bleaching agent and/or ultraviolet-ray absorber, preferably of the type set forth in the aforementioned copending applications, while the plasticizer is a phthalate, adipate, azelate, sebacate, organic phosphate or phosphite, chlorinated or sulfonated paraffin wax alone or in combination with antioxidizing and lubricating agents as described in the aforementioned prior applications.

Advantageously, the composition includes dyestuffs to yield the optimum light transmittancies as noted above and, as an essential component, one or more surface-active agents which are per se conventional and are compatible with the thermoplastic composition used in the formation of the sheet material.

Best results have been obtained with colorless or tinted sheet materials, which may be transparent or morely translucent but which consist of essentially (per 100 parts by weight of the polymer or thermoplastic) 0.5 to 10 parts by weight of the stabilizing component effective to provide light and heat stabilization alone (as noted above) or in synergistic combination with up to 30 parts by weight of a further stabilizer; 0 to 2 parts by weight of the optical bleaching agent or ultraviolet absorber; 0 to 100 parts by weight of the plasticizing composition which can include the antioxidizing substance mentioned earlier and 0 to 5 parts by weight of a lubricating composition; 0 to 5 parts by weight of the dyestuff or tinting agent; and 0.5 to 5 parts by weight of one or more surface-active agents. In general, aside from the surfactant, the composition may be any of those of the aforementioned copending applications.

The surface-active agents which are incorporated into the thermoplastic material according to the instant invention are, of course, compatible with the thermoplastic base and are selected such that they will not alter the transparency (intermittence characteristic) or substantially modify the film-forming properties of the composition during mixing and during or after the formation of the composition into a film or plate. The surface-active agents of the present invention may be of the anionic, cationic or nonionic types, although best results are obtainable with nonionic surface-active agents and especially with ethers and esters. At least one surface-active agent should be present although surfactant mixtures may be employed. Among the surface-active agents which have been found to be most suitable, are the polyalkylene glycols such as polyethylene glycol, polypropylene glycol and ethylene oxide/propylene oxide copolymers with terminal hydroxyl groups. A second class of compounds which can serve as the surface-active agent component of the present invention, is the polyalkylene glycol mono- and diesters with fatty aliphatic acids having 10 or more carbon atoms, e.g. lauric acid, palmitic acid, myristic acid, stearic acid, oleic acid and erucic acid.

Another class of surface-active agents suitable for incorporation in the composition according to the present invention is the monoesters of sorbitan with at least one fatty aliphatic acid having at least 10 carbon atoms and preferably a carbon number of 10 to 26. Sorbitan esters with lauric, palmitic, myristic, stearic, oleic or erucic acids are included in this class. It has also been found that the esterification products of polyalkylene glycols (i.e. polyethylene glycol, polypropylene glycol and ethylene oxide/propylene oxide mixed glycol) with the monoesters of sorbitan specified immediately above are effective surface-active agents for the present purpose.

(6) DESCRIPTION OF THE DRAWING

The above and other objects, features and advantages of the present invention will become readily apparent from the following description, reference being made to the accompanying drawing and subsequent specific examples. In the drawing.

(7) SPECIFIC DESCRIPTION

Figure 1:
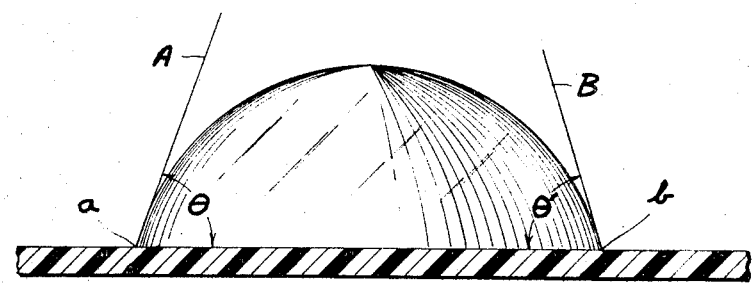
FIG. 1 illustrates in enlarged profile a condensate droplet according to the present invention.

In FIG. 1, we have represented a condensate droplet upon a solid surface such that the relevant interfaces are the water/air, the air/solid and the solid/water interfaces, the droplet being illustrated as it appears in a photomicrograph at 50 magnifications. Observation of the contact angle according to the invention is carried out with the assistance of microscopic observation of this type. A small 1 cm.$^3$ cell of the type commonly used for ultraviolet spectrograph analysis is employed as the receptacle for a polyvinylchloride support plate. On this support, there is placed a layer of filter paper saturated with water in order to enable saturation of the enclosed space with moisture whereupon the film or plate of the plant enclosure is introduced.

A water droplet with a volume of about 3 mm.$^3$ is placed upon the surface to be analyzed and the cell is hermetically closed. The cell is, in turn, maintained in a chamber thermostatically held at a temperature of 20° C. and the profile of the droplet is analyzed with a magnification of 50 times by observation through the walls of the cell. The microscopic observation demonstrates that the drop tends to flatten with time, i.e. the radius of curvature increases and the drop spreads. A photograph is taken in profile through the microscope exactly 60 minutes after formation of the drop, the photograph being represented in FIG. 1. Tangents are drawn as represented at A and B to the curve of the surface of the drop at the point at which contact is made with the surface, i.e. $a$ and $b$, thereby defining the angles $\theta$ and $\theta'$ which constitute contact angles. With the droplets in which the angle $\theta$ is shown to be 69.9° and the angle $\theta'$ is shown to be 72.6°, the two values are averaged and the contact angle for the purposes of the present invention is taken as 71.3°.

Figure 2:
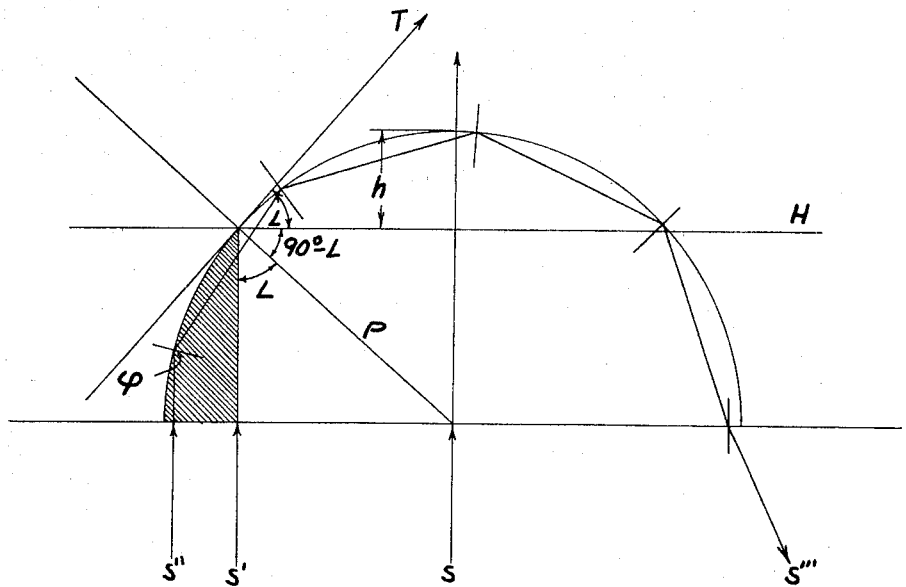
FIG. 2 is a diagram illustrating the definition of the contact angle.

The unflattened droplet is diagrammatically illustrated in FIG. 2 which shows the configuration obtained with plant coverings outside the scope of the present invention, i.e. in which the contact angle has not been reduced to the critical levels specified above by the incorporation of surface-active agents in the polymer.

The contact angle may be readily seen here to be 90° such that the droplet functions as a planoconvex lens. Incident sunlight entering the solid/liquid interface within the circumference of the droplet is represented at S and can be seen to be divisible into the rays offset from the axis of the droplet at S″ and S′ and rays which are axial (S), the central or axial rays S passing through the covering and the droplet with substantially no deviation. Hence, at the axis, the tangent to the droplet surface is perpendicular to the axis and the ray. Toward the outer periphery of the droplet, the rays S′ intersect a perpendicular P to the tangent T at a critical angle L and are thus refracted along the tangent T in the direction of the arrow thereof so that the rays S′ constitute the limiting rays for penetration of the light rays into the enclosure.

The rays S″ outwardly of these limiting rays intersect the perpendicular to the surface at an angle $\varphi$ which exceeds the critical angle L and are internally reflected one or more times, until they emerge again through the covering at S‴. The rays S‴ are lost or are nonutilizable for heating. When, however, the droplet is flattened by the incorporation of surface-active agents to decrease the solid/liquid surface tension $\gamma_{SL}$, there are no rays which can intersect the surface at an angle with the perpendicular thereto exceeding the critical angle L if the contact angle $\theta$ is reduced to 75° or below the critical angle L as defined by the relationship $$\sin L = \frac{n_2}{n_1}$$

wherein $n_2$ and $n_1$ have the meanings discussed earlier. Hence the droplets will practically have the shape located above the line represented at H in FIG. 2 and practically 100% of incident light rays will pass through the droplet into the protected space without internal reflection. Moreover, the altitude $h$ of the droplet is relatively low and the ability of the system to absorb energy is reduced.

Figure 3:
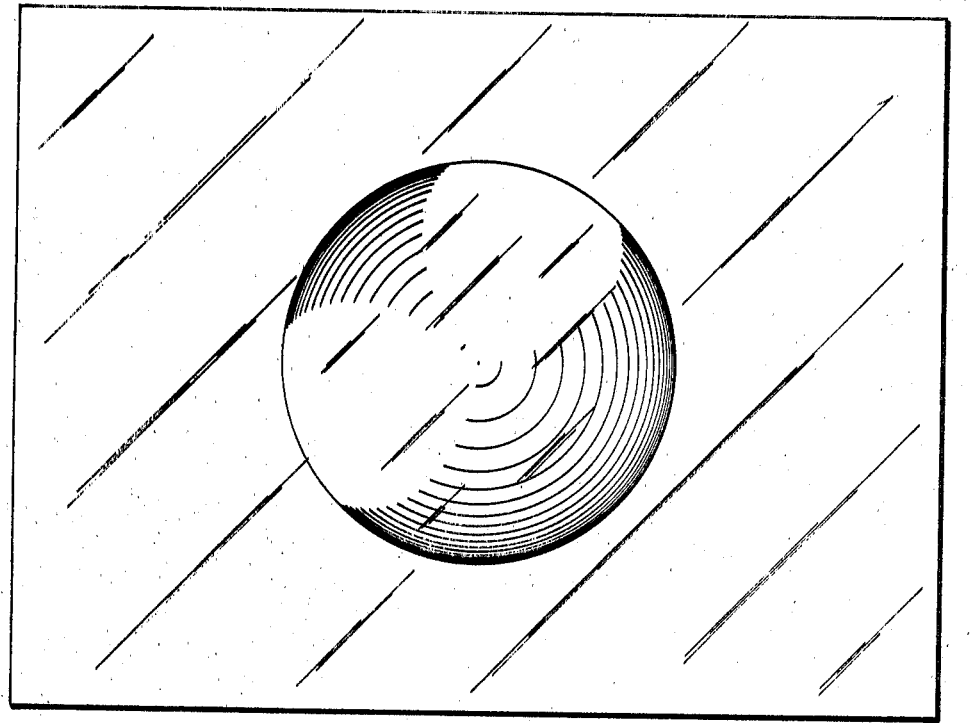
FIGS. 3 and 4 are plan views analogous to photomicrographs illustrative of the invention.
Figure 4:
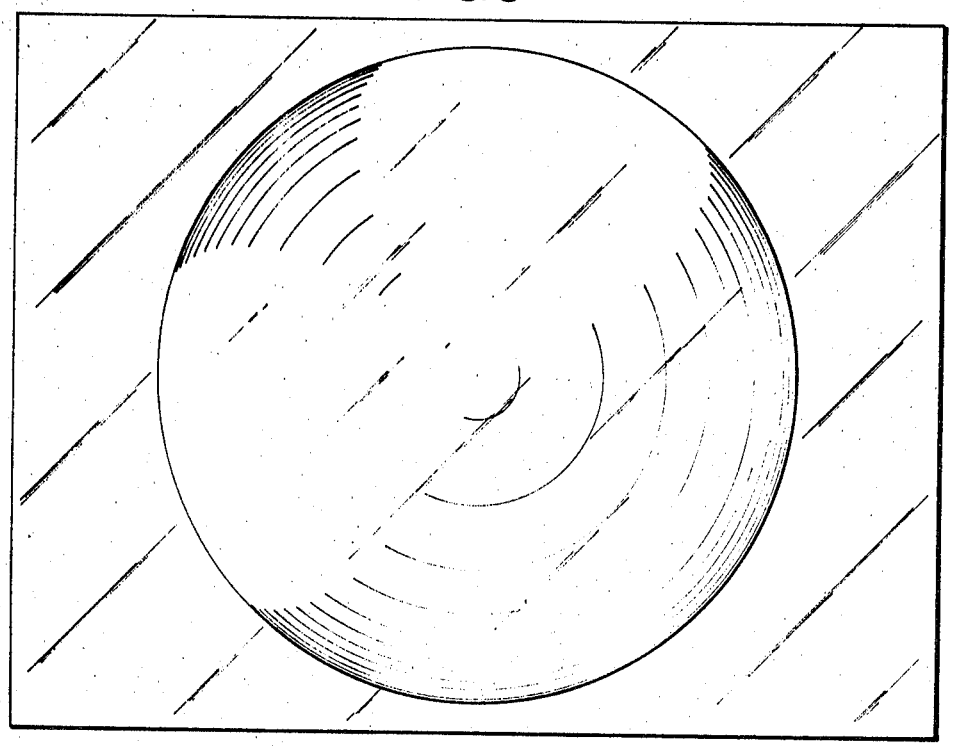

In FIGS. 3 and 4, we have diagrammatically shown a hemispherical droplet as deposited upon a synthetic-resin sheet from which the surfactants of the present invention have been omitted and a corresponding droplet as deposited upon a sheet containing 0.5 to 5 parts by weight (per 100 parts by weight of the polymeric material) of the surface-active agent. In the first case, the drop is practically hemispherical whereas the second case illustrates the flattened drop.

It should be noted that the critical angle L is a function of the wavelength of the incident light in the sense that in passing from the ultraviolet side of the spectrum to the infrared, the critical contact angle at which no internal reflection commences, may vary through about 2.2° (from about 46.8° to 49°). Consequently, a definition of the critical angle will require a fixed reference in terms of the wavelength of the incident light and the yellow sodium D-line has been selected with the measurement being made at 25° C. Hence the reference earlier to the refractive index $n_D^{25}$.

Figure 5:
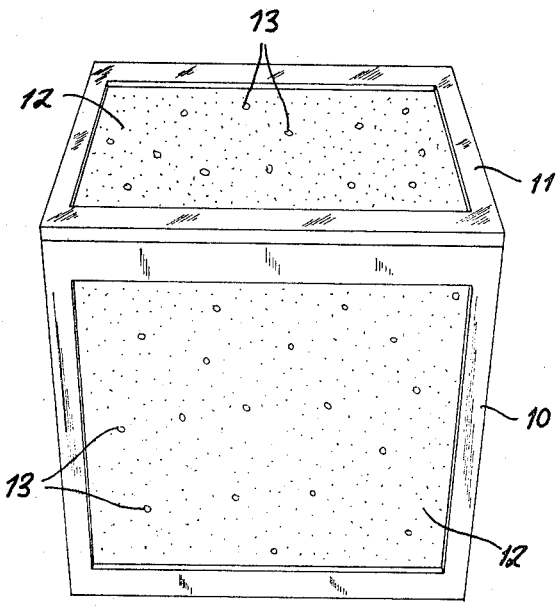
FIGS. 5 and 6 are perspective views of plant enclosures.

In FIG. 5 we have shown a small greenhouse or enclosure consisting of frames 10, 11, etc. spanned by polyvinylchloride film 12 and subjected to sunlight, while housing a plant-growth plot for a period of six months. Large condensate droplets 13 cover the inner surface of the walls of the structure and absorb a high proportion of the luminous and thermal energy.

Figure 6:
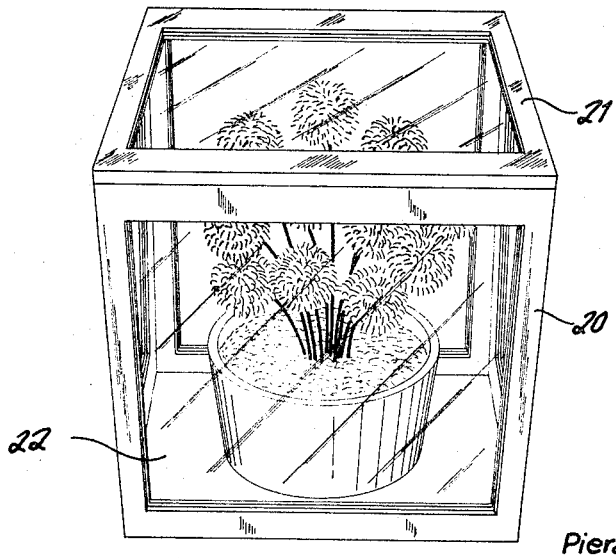

In FIG. 6, the frames 20, 21 are spanned by film 22 of similar thickness and after a corresponding period the greenhouse is shown to be substantially free from droplets and suffer no significant impediment to the radiation of the interior.

(8) SPECIFIC EXAMPLES

Examples 1–7

Films of a thickness of 0.15 mm. are made from a mixture of the following composition (all parts by weight):

| | Parts by weight |
|---|---|
| Granules of polyvinylchloride, known under the trade name of Sicron 548, manufactured by Montecatini Edison, by polymerization in aqueous suspension | 100 |
| Plasticizers: mixture of phthalic esters and epoxidized soya bean oil | 52 |
| Stabilizer: cadmium and barium soap | 3 |
| Surfactant: mixture of esters of a polyalcohol with acids having more than 10 carbon atoms (lauric, palmitic and myristic acid) | (¹) |

¹ See Table I.

Samples obtained from the films of Table I were placed into a transparent 1 cm.$^3$ cell, commonly used for ultraviolet analysis, wherein a rigid support and a sheet of filter paper soaked with water had been previously placed, in order to obtain rapid saturation of the space with water vapor; then the measurement of the contact angle with water-condensate droplets was carried out, at different intervals of time, according to the procedures specified in the above description. As the "average" contact angle, we intend an average of right and left contact angles which may be seen in FIG. 1.

The results are reported in Table I.

TABLE I

| Example | Parts by weight of surfactant | Average contact angle—after | | |
|---|---|---|---|---|
| | | 5′ | 60′ | 15 hours |
| 1 | | 91.0 | 86.8 | 86.2 |
| 2 | 1.0 | 87.0 | 68.3 | |
| 3 | 1.5 | 71.2 | 37.9 | |
| 4 | 2.0 | 68.7 | 30.5 | |
| 5 | 3.0 | 29.0 | 24.0 | |
| 6 | 4.0 | 26.0 | 22.3 | |
| 7 | 5.0 | 24.1 | 23.1 | |

Examples 8 and 9

Two small greenhouses were constructed with the films described in Examples 1 and 3.

The two greenhouses were exposed for a period of 42 days at a latitude of 43° and slightly above the sea level. The variations of temperature are reported in Tables II and III. From the data reported in the last item of Table III, it may be observed that the use of thermoplastic materials in the form of films and plates according to the present invention, gives a remarkable improvement with respect to the temperature and the relative humidity inside the greenhouse.

TABLE II (Example 8)

| Periods | Weekly average temperature | | | | Relative average weekly humidity, percent | | | |
|---|---|---|---|---|---|---|---|---|
| | Average daily temp. | Average maximum temp. | Average minimum temp. | Average daily difference | Average daily humidity | Average maximum humidity | Average minimum humidity | Average daily difference |
| 6/1/68 to 6/7/68 | 26.75 | 46.3 | 13.0 | 33.3 | 66.46 | 96.9 | 38.4 | 58.5 |
| 6/8/68 to 6/14/68 | 26.83 | 46.6 | 13.3 | 33.3 | 67.33 | 95.2 | 39.8 | 55.4 |
| 6/15/68 to 6/21/68 | 27.28 | 46.9 | 14.5 | 32.3 | 68.16 | 96.7 | 43.5 | 53.2 |
| 6/22/68 to 6/28/68 | 28.38 | 47.5 | 13.7 | 33.7 | 70.60 | 97.1 | 48.5 | 48.6 |
| 6/29/68 to 7/5/68 | 30.42 | 47.8 | 18.1 | 29.7 | 71.53 | 96.8 | 59.0 | 37.8 |
| 7/6/68 to 7/12/68 | 29.70 | 47.7 | 17.2 | 30.5 | 69.85 | 97.7 | 57.9 | 39.8 |
| Average of the whole period | 28.23 | 47.1 | 15.0 | 32.1 | 68.99 | 96.7 | 47.8 | 48.9 |

TABLE III (Example 9)

| Periods | Weekly average temperature | | | | Relative average weekly humidity, percent | | | |
|---|---|---|---|---|---|---|---|---|
| | Average daily temp. | Average maximum temp. | Average minimum temp. | Average daily difference | Average daily humidity | Average maximum humidity | Average minimum humidity | Average daily difference |
| 6/1/68 to 6/7/68 | 24.58 | 43.6 | 13.4 | 30.2 | 61.47 | 93.7 | 39.1 | 54.5 |
| 6/8/68 to 6/14/68 | 24.96 | 46.4 | 13.5 | 32.9 | 63.89 | 95.4 | 41.1 | 54.3 |
| 6/15/68 to 6/21/68 | 31.96 | 47.3 | 13.5 | 33.8 | 65.09 | 97.4 | 43.0 | 54.3 |
| 6/22/68 to 6/28/68 | 26.66 | 47.5 | 13.9 | 33.7 | 67.49 | 97.4 | 52.3 | 45.2 |
| 6/29/68 to 7/5/68 | 29.50 | 47.7 | 18.5 | 29.2 | 69.00 | 96.2 | 56.1 | 40.1 |
| 7/6/68 to 7/12/68 | 29.12 | 47.8 | 16.6 | 31.2 | 69.72 | 97.6 | 59.2 | 38.4 |
| Average of the whole period | 27.79 | 46.7 | 14.9 | 31.8 | 66.11 | 96.3 | 48.5 | 47.8 |
| Differences with respect to Example 8 | +0.44 | +0.40 | +0.1 | −0.3 | −2.88 | −0.4 | +0.7 | −1.1 |

Example 10

Twenty-four greenhouses, each of them covering an area of 50 m.², were built using as covering materials different transparent films of polyvinylchloride of the type hereunder described.

Four greenhouses (item 1) were covered with a film of the type described in Example 1 but containing 0.26 parts by weight of an UV absorber commercially known as UV 9 trademark of American Cyanamid Co. USA; four greenhouses (item 2) were covered with a film of the type described in Example 3 but containing 0.26 part by weight of an UV absorber commercially known as UV 9 trademark of American Cyanamid Co. USA; four greenhouses (item 3) were covered with a violet film prepared by blow-extrusion of a mixture made up of

| | Parts by weight |
|---|---|
| Sicron 548 (1) | 100 |
| Plasticizer (2) | 52 |
| Stabilizer (3) | 3 |
| UV absorber (4) | 0.2 |
| Violet dye (5) | 0.05 |

(1), (2), (3) see Example 1.

(4) a compound was used commercially known as UV 9, trademark of American Cyanamid Co. USA.

(5) a violet dye was used commercially known as Vat/Violet/2 (Color Index No. 73385).

Four greenhouses (item 4) were covered with a violet film of the type above described in connection with item 3, but containing 3% parts by weight of a surfactant of the type described in Example 1.

Four greenhouses (item 5) were covered with a yellow film prepared by blow-extrusion of a mixture made up of

| | Parts by weight |
|---|---|
| Sicron 548 (1) | 100 |
| Plasticizer (2) | 52 |
| Stabilizer (3) | 3 |
| UV absorber (4) | 0.2 |
| Yellow dye (5) | |

(1), (2), (3) and (4) see Example 1 and above in connection with items (1) and (2).

(5) a yellow dye was used commercially known as Pigment Gelb 83.

Finally four greenhouses (item 6) were covered with a yellow film of the type above described in connection with (item 5), but containing 3% parts by weight of a surfactant of the type described in Example 1.

All twenty-four greenhouses placed on the same piece of ground, were arranged in four adjacent groups each one containing six greenhouses according to the experimental scheme of random blocks.

Four replications (repetitions) were foreseen for each item.

In each greenhouse on May 11, 1968, 120 tomato plants (Supermanmande variety) were put into cultivation. These plants had been grown in a seed-plot up to the same development degree.

Within each greenhouse ground had been previously prepared and manured with the same procedure.

The method of plant cultivation (pollarding, treatments with pesticides, etc.) and the method of ground preparation (weeding, manuring, watering, etc.) were simultaneously carried out and always with the same standard and criterion in all twenty four greenhouses.

During the vegetative stage measurements relating to the height of the tomato plants were effected at four different dates (Mar. 29, Apr. 12, Apr. 26 and May 10, 1968).

For these measurements only twenty plants, selected at random among 120 cultivated in each greenhouse, were taken into consideration. Still for these twenty plants, the number of flowers in the first four clusters (or influorescences) was determined, and thereafter, the number of fruits originated from those flowers was also determined in order to calculate the setting index.

The gathering of fruits began on May 31 and lasted up to July 17, 1968.

On the whole 16 harvests were effected.

For each harvest, the weight and the number of fruits, obtained in each greenhouse, was determined.

The precocity index (in days) was determined on the basis of the amount of fruits obtained during the different harvests.

The agronomical data obtained during the above described cultivation tests are hereinunder summarized.

(1)

| | Height of the plants in centimeters measured at the date of— | | | |
|---|---|---|---|---|
| | March 29 | April 12 | April 26 | May 5 |
| Item: | | | | |
| 1 | 10.3 | 23.5 | 44.2 | 78.6 |
| 2 | 13.1 | 27.3 | 49.1 | 80.5 |
| 3 | 13.3 | 27.6 | 48.4 | 80.8 |
| 4 | 14.0 | 28.2 | 50.1 | 81.2 |
| 5 | 13.7 | 28.0 | 51.2 | 86.1 |
| 6 | 15.5 | 29.0 | 52.6 | 86.3 |

The data were determined on the basis of the average of the data relating to the twenty plants (for each greenhouse) of the four replications (or repetitions) of each item.

(2)

| | Median total weight (in kilograms) of fruits for each greenhouse | Number of fruits for each greenhouse | Median weight (in kilograms) of fruits for each greenhouse |
|---|---|---|---|
| Item: | | | |
| 1 | 233.9 | 2,293 | 101.9 |
| 2 | 237.8 | 2,346 | 101.4 |
| 3 | 265.9 | 2,381 | 111.7 |
| 4 | 276.3 | 2,401 | 115.1 |
| 5 | 254.1 | 2,386 | 106.5 |
| 6 | 265.4 | 2,420 | 109.7 |

The data were determined on the basis of the average of the data relating to the twenty plants (for each greenhouse) of the four replications (or repetitions) of each item.

(3)

| | Setting index (in percent) | Precocity index (in days) |
|---|---|---|
| Item: | | |
| 1 | 51 | 107.8 |
| 2 | 47 | 105.6 |
| 3 | 46 | 103.9 |
| 4 | 49 | 102.1 |
| 5 | 47 | 106.7 |
| 6 | 50 | 104.9 |

(4) In addition for items 1 and 2 the data are reported hereunder relating to the total amounts of fruits obtained for each harvest.

| | Item 1 | | Item 2 | |
|---|---|---|---|---|
| Date of harvest | Kg. | Percent | Kg. | Percent |
| May 31, 1968 | 0 | 0 | 0.23 | 0.09 |
| June 4, 1968 | 0.25 | 0.10 | 1.33 | 0.55 |
| June 9, 1968 | 6.24 | 2.66 | 16.73 | 7.03 |
| June 12, 1968 | 14.23 | 6.08 | 29.49 | 12.40 |
| June 16, 1968 | 27.29 | 11.66 | 44.55 | 18.73 |
| June 18, 1968 | 45.18 | 19.31 | 63.56 | 26.73 |
| June 20, 1968 | 60.56 | 25.88 | 78.18 | 32.88 |
| June 23, 1968 | 95.36 | 40.75 | 109.13 | 45.89 |
| June 25, 1968 | 116.59 | 49.83 | 129.41 | 54.42 |
| June 27, 1968 | 134.61 | 57.53 | 143.82 | 60.48 |
| June 30, 1968 | 158.62 | 67.79 | 163.60 | 68.62 |
| July 2, 1968 | 172.54 | 73.74 | 171.42 | 72.09 |
| July 4, 1968 | 183.43 | 78.39 | 181.99 | 76.54 |
| July 7, 1968 | 197.33 | 84.33 | 195.83 | 82.36 |
| July 11, 1968 | 213.17 | 91.10 | 212.94 | 89.56 |
| July 17, 1968 | 233.97 | 100.00 | 237.76 | 100.00 |

The same behaviour was observed for the other items. From the above reported data, it becomes quite evident that the films according to the present invention lead to a total harvest which is greater than that obtainable with films of the prior art (see specifically item (2) vs. item (1); item (4) vs. item (3); item (6) vs. item (5)).

In addition, from the data given under point (4) of this example, it can be seen that the films according to the present invention are also capable to increasing the rate of growth and ripening of tomato plants.

In fact when comparing the data of item (2) (film according to the invention) to those of item (1) (film according to prior art) it can be noticed that, at least for the first nine harvests (from May 31 to June 27) a remarkable improvement in the total production is obtained. This fact is particularly important since over this period the prices of tomatoes are the highest.

Example 11

Example 3 was repeated but using 1.5 parts by weight of polyoxyethyleneglycollaurate.

A film of quite similar properties was obtained.

Example 12

Example 3 was repeated but using a mixture made up of 1 part by weight of sorbitanmonolaurate and 0.5 part by weight of polyoxyethyleneglycollaurate.

A film of quite similar properties was obtained.

We claim:

1. A plant enclosure for a plant-growth site comprising a translucent thermoplastic covering composed of vinylchloride homopolymer or polymers of vinylchloride with up to 25% by weight of monomers copolymerizable therewith, a tinting agent or dyestuff present in an amount up to 5 parts per 100 parts by weight of the polymer and 0.5 to 5 parts by weight per 100 parts by weight of the polymer of a surface-active agent of a monoester of sorbitan with a fatty aliphatic acid having 10 to 26 carbon atoms, said covering having a water-condensate droplet contact angle L less than 75° as defined by the relation $$\sin L = \frac{n_2}{n_1}$$

wherein $n_2$ and $n_1$ are respectively the $n_D^{25}$ indices of refraction of air and water.

References Cited

UNITED STATES PATENTS

| 2,393,863 | 1/1946 | Myers | 260—Dig. 15 |
| 2,639,550 | 5/1953 | McKee | 47—17 |
| 3,028,872 | 4/1962 | Cresswell | 135—14 |
| 3,190,763 | 6/1965 | Schleede et al. | 260—Dig. 16 |
| 3,542,710 | 11/1970 | Glatti | 260—23 AR |

OTHER REFERENCES

Mason et al.: The Technology of Plastics and Resins, (D. Van Nostrand Co., N.Y.), 1946, pp. 34–35, TP986A2M5.

Modern Plastics Encyclopedia, vol. 45, No. 1A, September 1967, pp. 278–279, TP986A2M5.

WILLIAM H. SHORT, Primary Examiner

L. M. PHYNES, Assistant Examiner

U.S. Cl. X.R.

47—17, 19; 260—23 EP, 29.6 ME, 31.6, 45.75 R and K, 92.8 A